United States Patent [19]

Shinskey

[11] Patent Number: 4,855,897
[45] Date of Patent: Aug. 8, 1989

[54] METHOD AND APPARATUS FOR STATISTICAL SET POINT BIAS CONTROL

[75] Inventor: Francis G. Shinskey, Foxboro, Mass.

[73] Assignee: The Foxboro Company, Foxboro, Mass.

[21] Appl. No.: 73,798

[22] Filed: Jul. 13, 1987

[51] Int. Cl.4 ................ G06F 15/46; G05B 13/02
[52] U.S. Cl. .................. 364/148; 364/154;
364/152; 364/176; 364/554; 364/183
[58] Field of Search .......... 364/154, 153, 157, 152,
364/148, 554, 176, 183, 155; 318/561, 563, 609,
610, 632

[56] References Cited

U.S. PATENT DOCUMENTS

| 3,515,860 | 6/1970 | Fitzgerald | 364/155 |
|---|---|---|---|
| 3,648,035 | 3/1972 | Hart et al. | 235/151.1 |
| 3,758,762 | 9/1973 | Littman et al. | 364/149 |
| 3,781,533 | 12/1973 | Barnstone | 364/153 |
| 3,876,872 | 4/1975 | Spitz | 235/151.1 |
| 4,008,386 | 2/1977 | Ross | 318/610 |
| 4,275,439 | 6/1981 | Kuwata | 364/152 |
| 4,320,463 | 3/1982 | Himmelstein | 364/552 |
| 4,481,567 | 11/1984 | Kaya et al. | 364/157 |
| 4,679,136 | 7/1987 | Shigemasa | 364/157 |
| 4,736,316 | 4/1988 | Wallman | 364/159 |

FOREIGN PATENT DOCUMENTS 1318871 5/1973 United Kingdom .
1438515 6/1976 United Kingdom .

OTHER PUBLICATIONS

"Statistics Invade Distributed Control Systems", George J. Bickley (Senior Editor), *Control Engineering*, Nov. 1987, pp. 52–54.
"Statistical Process Control Goes On-Line", Dr. Paul J. Merluzzi, Jr., (Sequential Automation Consultants), *Chemical Processing*, Nov. 1987, pp. 31, 32, 35.
IIE Transactions, vol. 19, No. 2, Jun. 1987, pp. 208–214, Neuhardt, J. B., "Effects of Correlated Subsamples in Statistical Process Control".
Journal of Quality Technology, vol. 7, No. 4, Oct. 1975, pp. 183–192.
Chemical Engineering, Aug. 8, 1983, pp. 73–77.
Chemical Processing, Feb. 1987, pp. 44, 46, 48.
"Statistical Process Control: Modern Concepts with an Historical Respective", Paul J. Merluzzi, Jr., ISA Paper #87-1123, pp. 733–751.

*Primary Examiner*—Jerry Smith
*Assistant Examiner*—P. Gordon
*Attorney, Agent, or Firm*—Jules Jay Morris

[57] ABSTRACT

A process controller may incorporate statistical computations of the variance in the controlled variable. Statistical measures may then be used to offset the controller set point to maintain the controlled variable distribution in an acceptable specification zone. The statistical measures may be made automatically and continuously thereby obviating human intervention, while producing high quality, though statistically variable, process output. The statistical measures may be calculated specifically or generated by a weighted integration method.

18 Claims, 1 Drawing Sheet

PROGRAMMED STATISTICAL BIASING

METHOD AND APPARATUS FOR STATISTICAL SET POINT BIAS CONTROL

TECHNICAL FIELD

The present invention relates to feedback control devices, and in particular to feedback control devices employing a numerically calculated set point.

BACKGROUND ART

Industrial process controllers are commonly tuned to control an output to meet a particular output specification. Where the features of the system function ideally, setting the control to the ideal specification then produces the specified output with no variation. Material handling systems do not work ideally for numerous reasons, and as a result there is frequently a statical distribution in the output from the system. Where there is no functional difference between the high side and the low side results of the statistical distribution, setting the control to meet the center of the statistical distribution is a correct choice.

Functional differences may exist between the high and low sides of the distribution. One side of the distribution is then acceptable, while the other is not. For example a chemical reaction may occur on the high side of the distribution that produces a pollutant thereby spoiling the output, or the material or energy investment may exceed what is necessary thereby wasting resources. In the cases where an important difference the process needs to be controlled so the distribution exists in the output distribution, is on the preferred side of the specification and then to be within a measure of closeness to the specification.

Where the distribution is known and has a fixed value, a simple solution is to manually position the set point to a level offset from the specification by an amount sufficient to locate the distribution center in the preferred zone, but close enough to the specification so the amount of output falling in the unacceptable zone is tolerable. Unfortunately, an output distribution is generally not known, and is likely to change in time. Further, the feature important to control may not be the center of the distribution, which may not be symmetric, but the amount of product, or the existence of any product occurring in the unacceptable zone.

SUMMARY OF THE INVENTION

Biasing the set point of a controller to the preferred side of a specification limit in relation to the standard deviation or variation in the controlled variable keeps most of the excursions in the controlled variable on the acceptable side of specification limit. The specification limit may then be approached as closely as observed variation allows. The controlled process may then be maximized for profit or quality by keeping the controlled variable close to the specification limit, but without exceeding the limit.

BEST MODE FOR MAKING THE INVENTION

Figure 1:
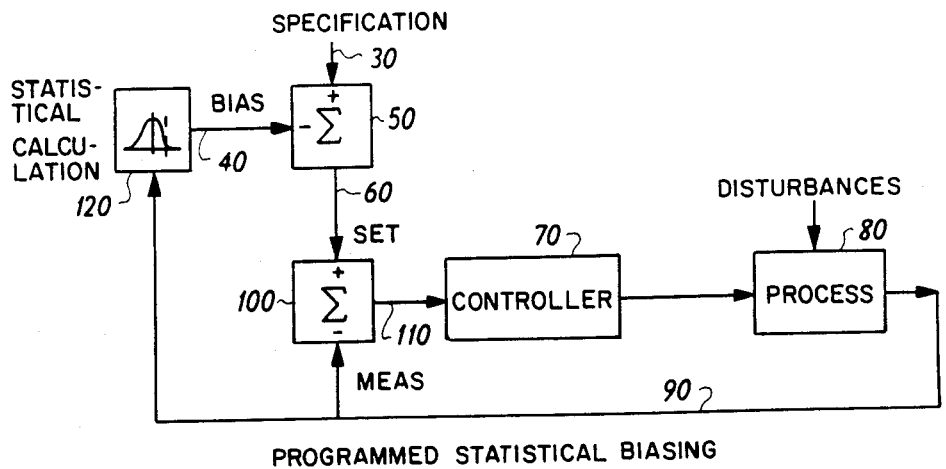
FIG. 1 shows a schematic diagram of a statistical control process.

FIG. 1 shows a schematic diagram of a control process employing a statistical control process. A specification limit 30 is received defining the preferred output condition. The specification limit 30 is then augmented or diminished by a bias amount 40 in a summation block 50 depending on whether errors in the process output are preferred on the high side or low side of the specification limit 30. The specification limit 30 offset by the bias amount 40 is then the set point 60 for a controller 70.

The controller 70 affects a process 80 having a measured feature called a measured variable 90. The goal of the controller 70 is to bring the process 80 to a state where the measured variable equals the set point 60, or in the present case, where the distribution of the measured variable 90 values is offset on the preferred side of the specification limit 30. The set point 60 and measured variable 90 are used to produce a control signal affecting the controller. Commonly, the difference between the set point 60 and the measured variable 90 is computed in a difference block 100 as an error signal 110 used as the control signal. The error signal 110 is supplied to the controller 70 to direct the direction and size of the controller's response in affecting the process 80 and correspondingly the measured variable 90. The process 80 is sensed to produce the measured variable 90 which is returned to the difference block 100 to generate the error signal 110.

Applicant additionally supplies the measured variable 90 to a bias calculating block 120. The bias calculating block 120 calculates a statistical measure of the distribution in the measured variable 90, for example, the standard deviation. The statistical measure is then appropriately scaled to produce the bias amount 40.

Numerous statistical measures may be made. The standard deviation is a familiar and preferred measure by the applicant. To compute the standard deviation of the measured variable 90, an average value of the measured variable 90 is computed for a sample period. The length of the sample period is determined by the user in accordance with the nature of the process 80, the sampling rate of the measured variable 90, and the level of confidence sought. Where the specification limit 30 has a fixed value, and the process 80 is slow moving in comparison to the sampling rate, good statistics may generally be taken under all conditions. Where the distribution is changing, the statistic needs to be normalized by the distribution trend, and compensated for the delay in the process 80.

The average sample value of the measured variable 90 may be computed as a running average of a number of sample values. A number $n_s$ is selected by the user which is the number of samples to be averaged. The number $n_s$ times the sample rate $t_r$ gives an effective sample period, which in the preferred form exceeds the closed loop period of the measured signal, and in further preference is set to correspond to the capacity of the process 80.

The sample average, $s_{ave}$, may be computed in several ways. A running average may be computed by summing the $n_s$ most recent sample values $s_i$ and dividing the sum by the sample count $n_s$. With each additional sample, the oldest sample value $s_{(i-ns-1)}$ is removed, while the newest sample value $s_i$ is included in the sum. The sum is divided by the sample count $n_s$.

Alternatively, a weighted time series sum may be computed, for example, $s_{ave} = \Sigma s_i e^{-t_i/\tau}$, where all sample values $s_i$ are included but given less weight as the sample ages. The time $t_i$ is the age of the sample $s_i$. The factor $\tau$ is a time constant similar to the sample count $n_s$ selected by the user to correspond to the process 80, sampling rate and other process 80 features. The weighted time series is conveniently computed as a percentage of the previous weighted average plus the remaining percentage times the current sample value, $s_{ave}=(x\%)(s_{old})+(100-x\%)(s_i)$.

Alternatively a block average, although not a preferred average, may be computed where $n_s$ samples are taken, and averaged as a block. The next $n_s$ values are used as a block for the next average calculation. Applicant prefers a running average.

The average value, $s_{ave}$, is subtracted from the current sample value, $s_i$, and the result squared, $(s_i-s_{ave})^2$. The squared value is then averaged over a number of samples. Again the average of the squared values may be computed in the several ways listed. Averaging the sum of the squares in the same fashion as the sample average is convenient. Again a running average is preferred. The square root of the result is the standard deviation. The standard deviation is then scaled according to the degree of quality assurance required in measured variable 90. For a normal distribution and an offset of one standard deviation, only 15.87 percent of the measured variable 90 samples should be in the unacceptable zone, for an offset of two standard deviations only 2.28 percent of the output should be in the unacceptable zone, and for three standard deviations, only 0.14 percent.

To enhance the uniformity of the distribution in the measured variable 90 a subgrouping procedure may be performed. A subgroup of $n_s$ samples, four or more, may be averaged as a group to form a subgroup sample value $sg_j$. The statistical analysis is performed on the subgroup sample values $sg_j$. Thus, the standard deviation calculated is for the subgroup values $sg_j$ which may then be converted to the standard deviation of the individual samples $s_i$ by multiplying by the square root of the number of samples in the subgroup.

The statistically calculated bias operates with the assumption that the set point is at the mean of the distribution. If the process is nonlinear, distribution of the controlled variable tends to be skewed leading to a statistically inaccurate result. Compensation may be applied to the set point 60 and measurement variable 90 signals to linearize the signals, and as a result, to linearize the error signal 110 and the response of the controller. The distribution in the measured variable 90 is then forced to become more uniform. However, the mean of measured variable 90 distribution curve may no longer coincide with the set point 60 of the controller 70. Setting the bias 40 as function of the standard deviation is then not completely accurate, and fails according to the degree of skewness in the measured variable 90.

An alternative method and apparatus uses an integrator to position the set point so no more than a selected percentage of the integrated area between the measured variable and the specification limit lies on the unacceptable side of the specification limit. An integrator gain is weighted so a higher gain is applied when the measurement is on the unacceptable side of the specification limit than when the measurement is on the acceptable side of the specification. The gains are weighted in portion to the ratio of the desired integrated, areas.

Figure 2:
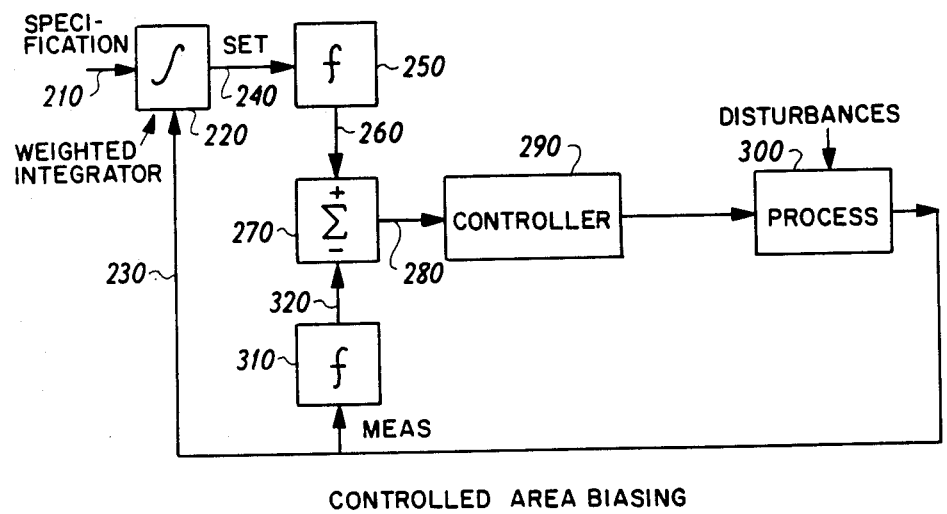
FIG. 2 shows a schematic diagram of a preferred control process.

FIG. 2 shows a schematic diagram of a preferred controlled area biasing control process. A specification limit 210 is received by an integrator block 220. Broadly, the integrator block 220 responds to the difference between the specification limit 210 and a measurement signal 230. As the difference increases, the response of the integrator block 220 increases. The integrator block 220 also responds to the duration of the difference. As the duration of the difference increases, the response of the integrator block also increases.

The integrator block 220 also responds to a gain factor. A separate gain block may be used, operating with the measurement signal 230, and providing a gain signal to the integrator block 220. Applicant prefers including the gain generating process in the integrator block 220. The gain producing means in a simple and preferred form examines the measurement signal 230 for one of two conditions. Where the measurement signal 230 is on the preferred side of the measurement distribution, the gain signal is low. Where the measurement signal 230 is on the unacceptable side of the specification limit 210 the gain signal is high. Preferably, the product of the low gain and the portion of the output sought to be on the preferred side of the specification limit equals the product of the high gain and the portion of the output allowed in the unacceptable side of the distribution. For example, where 97 percent of the distribution is sought to be in the acceptable region, and 3 percent is allowed in the unacceptable region, the low gain signal times 97 should equal 3 times the high gain signal. Conceptually the preferred integrator block 220 integrates the area between the specification and measurement amounts, and weights the result so the area on the unacceptable side appears large. The preferred integrator block 220 integrates the difference between the specification limit 210 and the measurement signal 230 according to a two state (high low) gain function. The integrator block 220 then outputs a set point signal 240.

The set point signal 240 may optionally be linearized in a set point function block 250 to produce a linearized set point signal 260. The set point signal 240, or linearized set point signal 260, as the case may be, is combined in a difference block 270 with the measurement signal 230 to produce an error signal 280. The error signal 280 is supplied to a controller 290 operating on a process 300 having a measured feature to produce the measured signal 230. The measured signal 230 may optionally be linearized in a measurement function block 310 to produce a linearized measurement signal 320. In most instances, where the set point 240 is linearized in a function block 250, the measurement signal 230 is linearized correspondingly so the two signals combined in the difference block 270 are comparable.

While there have been shown and described what are at present considered to be the preferred embodiments of the invention, it will be apparent to those skilled in the art that various changes and modifications can be made herein without departing from the scope of the invention defined by the appended claims. For example, numerous combinations and formulations of statistical measures are possible. Different statistical moments, cubic or higher orders, may be made, or corresponding roots of higher order moments may be made. Different distributions in the measured variable other than a normal distribution may be used or assumed. The calculation and signal processes may be performed by digital or analog equipment, or may be implemented directly in hardware as is within the scope of those skilled in the art.

I claim:

1. A method for set point bias control of a process with a controller receiving a set point value to operate on the process producing a measured amount comprising the steps of:
(a) receiving a specification limit,
(b) offsetting the specification limit in a preferred direction with a bias amount to produce a set point amount,
(c) generating a error signal amount from the set point amount and the measured amount,
(d) controlling a process according to the error signal amount,
(e) measuring a process feature to produce the measured amount, and
(f) performing a bias computation on the measured amount to generate the bias amount.

2. The method in claim 1 wherein generating the set point bias includes performing a statistical measure of the measured amount to produce the set point bias related to the statistical measure.

3. The method in claim 2 wherein the statistical measure is a measure of standard deviation.

4. The method in claim 3 including the step of scaling the standard deviation to produce the bias.

5. A method for set point bias control of a process with a controller receiving a set point amount to operate on the process producing a measured amount comprising the steps of:
(a) receiving a specification limit,
(b) offsetting the specification limit in a preferred direction with a bias amount to produce a set point amount,
(c) generating a error signal amount as a difference between the set point amount and a measured amount,
(d) controlling a process according to the error signal amount,
(e) measuring a process feature to produce the measured amount,
(f) performing a bias computation on the measured amount to generate the bias amount from a measure of standard deviation of the measured amount to produce the set point bias, and
(g) scaling the measure of standard deviation to produce the bias amount.

6. A method for set point bias control of a process with a controller receiving a set point value to operate on the process producing a measured amount comprising the steps of:
(a) receiving a specification limit,
(b) producing a set point amount from a difference between the specification limit and the measured amount, a duration of the difference, and a first gain while the measured amount is on a preferred side of the specification limit and a second gain while the measured amount is not on the preferred side of the specification limit,
(c) generating an error signal amount in response to the set point amount and the measured amount,
(d) controlling the process according to the error signal amount, and
(e) measuring a process feature to produce the measured amount.

7. The method in claim 6 wherein producing the set point amount includes the steps of:
(a) integrating the difference between the specification limit and a measured amount, to form an integration result and
(b) multiplying the integration result by a first gain while the measured amount is on a preferred side of the specification limit and by a second gain while the measured amount in not on the preferred side to produce the set point amount.

8. The method in claim 7 wherein the second gain is greater than the first gain.

9. The method in claim 7 wherein the second gain is greater than the first gain in ratio to the amount the measured amount on the preferred side of the specification limit is sought to have to the amount of the measured amount not on the preferred side of the specification limit.

10. Process control apparatus for set point bias control of a process having at least one specification limit, comprising:
(a) means for determining a measured process value,
(b) a process controller responsive to a set point condition and to the measured process value to produce a control signal for controlling the process,
(c) means for generating a set point bias, and
(d) means for offsetting a specification limit by the set point bias in a preferred direction to produce the set point condition,
wherein the set point bias generating means includes means for determining a statistical measure of the measured process value to produce the set point bias in a form related to the statistical measure, and wherein the statistical measure includes an nth degree moment surface.

11. The device in claim 10 wherein the statistical measure includes an nth degree root of an nth degree moment measure.

12. The device in claim 10 wherein the statistical measure includes a standard deviation measure.

13. The device in claim 12 wherein the standard deviation is scaled to produce the set point bias.

14. The device in claim 10 wherein the statistical measure includes a variance value determinable from the measured process value, scaled to produce the bias.

15. The device in claim 10 wherein the statistical measure is scaled to produce the bias.

16. Process control apparatus for set point bias control of a process having at least one specification limit, comprising:
(a) means for determining a measured process value,
(b) a process controller responsive to a set point value and to the measured process value to produce a control signal for use in effecting a change in the measured process value,
(c) means for producing the set point value offset by a bias value from a specification limit on a preferred side of the specification limit, and
(d) means for generating a control signal from the set point value and the measured process value,
wherein said means for producing the set point value further includes means for producing a bias offsetting the set point value from the specification value such that over a time average, the portion of the measured process value on a preferred side of the specification limit at least equals a desired portion of the total measured amount, and wherein the means for producing the set point value includes an integrator.

17. The process control apparatus of claim 16 wherein the integrator includes a two-state gain function having a first gain factor applied when the measured process value is on a preferred side of the specification limit and a second gain factor applied when the measured process value is on the unpreferred side of the specification limit.

18. The process control apparatus of claim 17 wherein the first and second gain factors are in proportion to the size of the measured process value desired on the preferred side of the specification limit to the size of the measured process value desired on the unpreferred side of the specification limit.

* * * * *